United States Patent
Pavlovic et al.

(10) Patent No.: US 6,640,698 B2
(45) Date of Patent: Nov. 4, 2003

(54) FOOD PROCESSOR

(75) Inventors: Henrik Pavlovic, Ljubno Ob Savinji (SI); Jurij Pesec, Petrovce (SI); Igor Zibret, Smartno Ob Paki (SI)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 0 days.

(21) Appl. No.: 10/260,640

(22) Filed: Sep. 30, 2002

(65) Prior Publication Data

US 2003/0070564 A1 Apr. 17, 2003

Related U.S. Application Data

(63) Continuation of application No. PCT/EP01/02056, filed on Feb. 22, 2001.

(30) Foreign Application Priority Data

Mar. 31, 2000 (DE) .......................... 100 16 292

(51) Int. Cl.$^7$ .............................. A23L 1/00; A23N 1/00; A47J 44/00; A47J 44/02; B01F 9/00
(52) U.S. Cl. .............................. 99/492; 99/348; 99/511; 241/37.5; 241/92; 366/314; 366/601
(58) Field of Search .................. 99/484, 485, 486, 99/489, 492, 495, 509–513; 210/360.1, 380.1; 241/37.5, 73, 92, 86.1, 89.3, 282.2, 282.1, 261.1, 101.2, 199.12; 366/314, 601, 205, 206; 426/61, 63, 49, 52, 533, 599; 494/36, 43, 56, 58

(56) References Cited

U.S. PATENT DOCUMENTS

| 5,392,699 A | * | 2/1995 | Tai ............................... 99/513 |
| 5,417,152 A | * | 5/1995 | Harrison ...................... 99/511 |
| 5,524,530 A | | 6/1996 | Nijzingh et al. |
| 5,979,806 A | | 11/1999 | Börger et al. |

* cited by examiner

*Primary Examiner*—Timothy F. Simone
(74) *Attorney, Agent, or Firm*—Laurence A. Greenberg; Werner H. Stemer; Ralph E. Locher

(57) ABSTRACT

A food processor includes two coupling points for processing appliances, the points disposed in a three-dimensionally spaced manner on a housing, output shafts respectively driven by a drive motor provided at each coupling point, an actuating element coupled to a switch located in an electrical circuit of motor is provided on the housing. The food processor cannot be operated if one of the coupling points is not covered because, in addition to the switch in the electrical circuit of the drive motor, two switching contacts, connected in series, are provided, one of which can be switched into its closed position directly or indirectly by the placing of a processing appliance or cover part on one coupling point and the other can be switched into its closed position directly or indirectly by the placing of a processing appliance or a cover part on the other coupling point.

23 Claims, 3 Drawing Sheets

FOOD PROCESSOR

CROSS-REFERENCE TO RELATED APPLICATION

This application is a continuation of copending International Application No. PCT/EP01/02056, filed Feb. 22, 2001, which designated the United States and was not published in English.

BACKGROUND OF THE INVENTION

FIELD OF THE INVENTION

The invention relates to a food processor having two coupling points for processing appliances disposed in a three-dimensionally spaced manner on the processor housing, a output shaft, driven by the drive motor of the food processor, being provided at each coupling point, in which food processor, moreover, an actuating element coupled to a switch located in the electrical circuit of the drive motor is provided on the housing thereof.

In a commercially available food processor, a coupling point for a mixing bowl is provided on a horizontal base part of the housing of the food processor and a further coupling point, lying axially above the drive motor, is provided on a vertically extending housing part containing the drive motor. In such a configuration, the end of an output shaft for coupling the working tool of the processing appliance currently in use is freely accessible at each coupling point. If a processing appliance is placed on only one coupling point, or on neither of the coupling points, there is a high risk of injury if the drive motor of the food processor is switched on.

SUMMARY OF THE INVENTION

It is accordingly an object of the invention to provide a food processor that overcomes the hereinafore-mentioned disadvantages of the heretofore-known devices of this general type and that cannot be operated if one of the coupling points is not covered.

With the foregoing and other objects in view, there is provided, in accordance with the invention, a food processor, including a housing having two coupling points for receiving attachments thereat, the attachments including a cover part and different appliances, the two coupling points three-dimensionally spaced apart from one another, a drive motor disposed in the housing, the drive motor having an electrical circuit with a switch and at least two switching contacts connected in series and each having an open position and a closed position, a first of the at least two switching contacts being switched into the closed position one of directly and indirectly dependent upon a placement of one of the cover part and an appliance at a first of the two coupling points, a second of the at least two switching contacts being switched into the closed position one of directly and indirectly by a placement of another of the cover part and an appliance at a second of the two coupling points, two output shafts each connected to and driven by the drive motor, the two output shafts respectively disposed at each of the two coupling points for connection to a respective one of the cover part and the appliances, and an actuating element coupled to the switch and disposed on the housing for actuating the switch.

In accordance with another feature of the invention, in addition to the switch in the electrical circuit of the drive motor, two switching contacts, connected in series, are provided, one of which can be switched into its closed position directly or indirectly by the placing of a processing appliance or cover part on one coupling point and the other can be switched into its closed position directly or indirectly by the placing of a processing appliance or a cover part on the other coupling point. The electrical circuit of the drive motor can, thus, be closed by the switch only if either a processing appliance or a cover part is placed on both coupling points. Thus, in the switched-on state of the food processor, neither of the output shafts is still freely accessible and no risk of injury exists.

In accordance with a further feature of the invention, as a result of the fact that the two switching contacts are disposed on a pivotable circuit board (which is retained in a rest position by the action of force thereon), a pivoting movement causing the switching-over of one or the other switching contact is exerted when a processing appliance or cover part is placed on one or the other coupling point. The switching contact in question does not need to be directly actuated by a processing appliance or cover part to be placed in position. As a result, greater construction freedom exists.

In accordance with an added feature of the invention, the switching-over of whichever switching contact is not actuated by the pivoting of the circuit board takes place as the result of the fact that the two switching contacts are coupled to a switching rod, which is fixed by one of its ends to the circuit board and, on the other end of which, a switching movement is exerted when a processing appliance or cover part is placed on one or the other coupling point.

In a food processor with a mixing bowl that can be placed in position, in accordance with an additional feature of the invention, it is advantageous if a radially outward-projecting tab is formed on the lid of the mixing bowl as an adjusting member that can be pivoted, by a corresponding rotational movement of the lid, into a slit provided on a vertically extending housing part of the food processor, which tab acts directly or indirectly on the switching rod of the two switching contacts so as to cause switching-over of one switching contact.

In accordance with yet another feature of the invention, as a result of the fact that a locking member, including at least one lever arm and pivotable by the tab, is disposed in the interior of the housing adjacent to the slit, its lever arm acting on the switching rod, even relatively large distances between the tab and the switching rod, caused by configuration circumstances, can be bridged.

In accordance with yet a further feature of the invention, the pivoting of the circuit board necessary for switching over the other switching contact is provided, expediently, when a processing appliance or cover part is placed on the other coupling point. When such placement occurs, the pivoting of the circuit board is achieved in a simple manner in that an approach slope is provided directly on the circuit board or on a part connected thereto, on which approach slope a pivoting force is exerted when a processing appliance or cover part is placed in position.

Relatively large, configuration-induced distances between the approach slope and the processing appliance or cover part interacting therewith can be bridged by providing an intermediate member resting on the approach slope that is depressed when the processing appliance or cover part is placed in position.

In accordance with yet an added feature of the invention, the circuit board is expediently retained in or restored to its position of rest by a spring as soon as the restoring path is freed by removal of the processing appliance or cover part from the coupling point in question. As a result of the automatic restoration of the circuit board, the switching contact in question is switched back into its open position and the electrical circuit of the drive motor is, thus, interrupted. The interruption ensures that the output shaft in question no longer rotates after the removal of the processing appliance or cover part.

In accordance with a concomitant feature of the invention, an additional mechanical safeguard against switching-on of the drive motor is provided by having at least one further lever arm on the locking member, which lies in the adjustment path of a locking block that can be adjusted by a movement switching the switch actuating element on and off in the position of rest of the locking member and leaves the adjustment path free when the locking member is pivoted.

Other features that are considered as characteristic for the invention are set forth in the appended claims.

Although the invention is illustrated and described herein as embodied in a food processor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
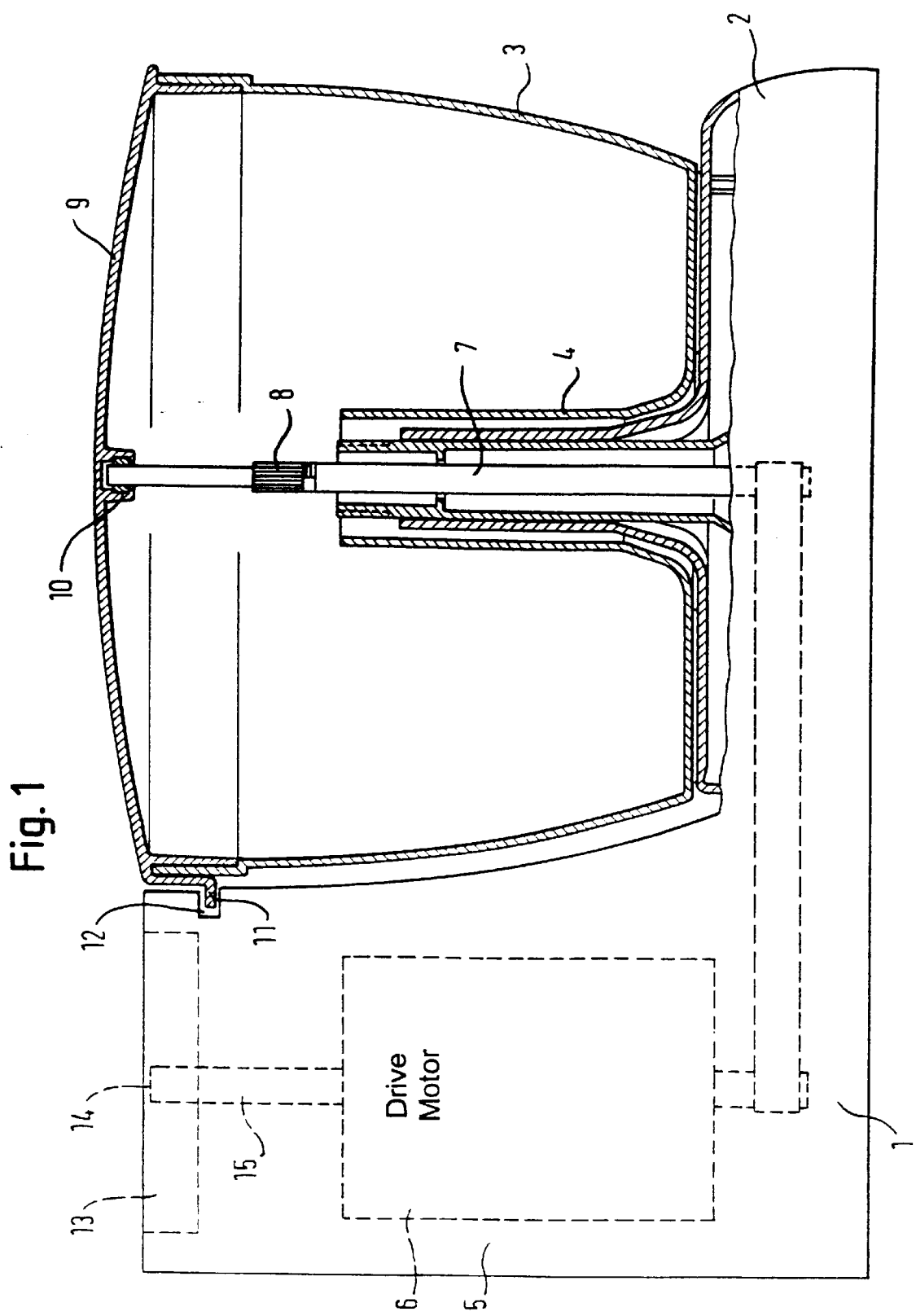
FIG. 1 is a partially cross-sectional, partially cut away, and partially hidden view of a food processor with two coupling points for processing appliances according to the invention.

Referring now to the figures of the drawings in detail and first, particularly to FIG. 1 thereof, there is shown a housing 1 of a food processor with a mixing bowl 3 placed on the horizontal base part 2 of the housing 1. The base part 2, thus, forms a coupling point for a processing appliance or cover part. The mixing bowl 3 has a hollow connector 4 at its center, through which is guided a first output shaft 7, driven by the drive motor 6 installed in the vertically extending housing part 5 of the housing 1. The first output shaft 7 includes a connecting point 8 for processing tools that are located in a processing appliance that can be placed on a coupling point. The first output shaft 7 is mounted by its free end in a bearing seating 10 provided on the lid 9 of the mixing bowl 3. A radially outward-pointing tab 11 is molded on the lid 9 and can be pivoted by a pivoting movement of the lid 9 into a horizontal slit 12 provided on the vertical housing part 5.

A receiving depression 13 is formed on the top of the vertically extending housing part 5. The end 14 of a second output shaft 15, which in the present case represents an extension of the motor shaft of the drive motor 5, provided with a coupling facility for a processing tool 40 shown in FIGS. 5 and 6 projects into the receiving depression 13. A processing appliance 40 or a cover part 43 shown in FIGS. 5 and 6 can be inserted by its base into the receiving depression 13, the end 14 of the second output shaft 15, then coming into driving connection with the processing tool of the processing appliance. The receiving depression 13, thus, forms another coupling point of the food processor for the appropriate processing appliances.

If, in the food processor shown in FIG. 1, a processing appliance or cover part is placed only on one, or on neither, of the two coupling points, then at least the ends of the two output shafts 7, 15 are freely accessible to a user. Such accessibility can easily result in injuries if a user touches the ends of the output shafts 7, 15 while the drive motor 6 is switched on. To exclude such possibilities of injury, the food processor is equipped with a corresponding safety device, described in further detail below.

Figure 2:
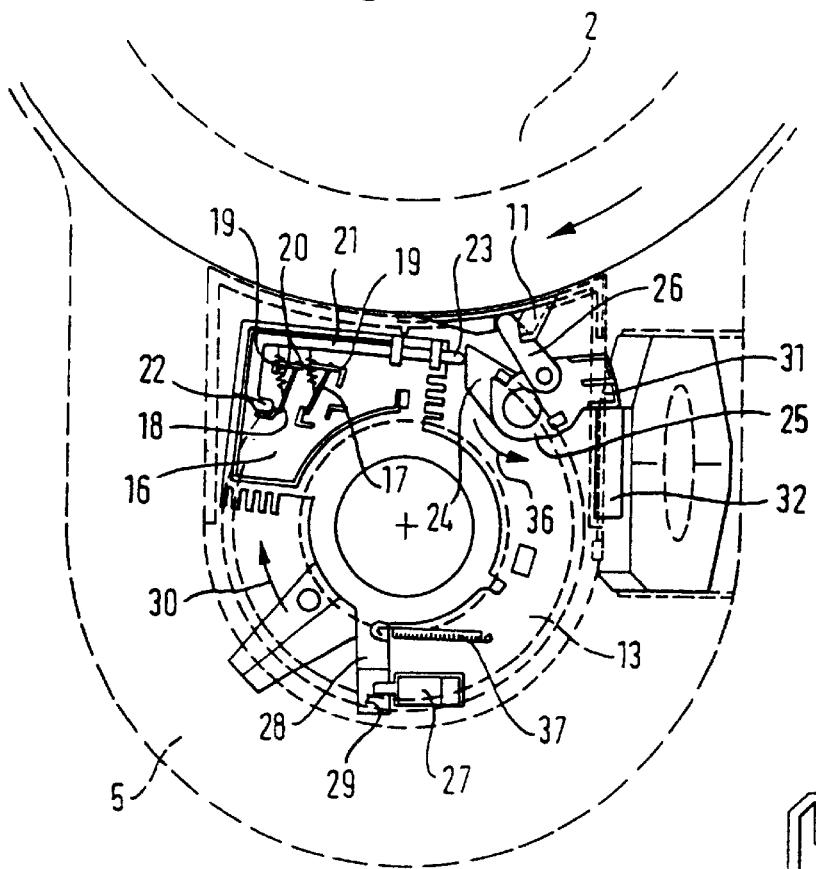
FIG. 2 is a fragmentary, partially hidden plan view of a circuit board, bearing switching contacts, in the region of a coupling point of the food processor of FIG. 1

As shown in FIG. 2, two switching contacts 17, 18 are attached to a circuit board 16, the circuit board 16 being twistably disposed on an extension of the housing of the drive motor 6 resembling a tubular connector. These switching contacts 17, 18 are each fixed by one end to angular holders 19 for the circuit board 16. The switching contacts 17, 18 are coupled through spring elements 20 to a switching rod 21 that is pivotally fixed by one of its ends 22 to the circuit board 16. The other end 23 of the switching rod 21 projects into the pivot path of one lever arm 24 of a locking member 25, which is pivotally disposed and can be pivoted by the tab 11 of the lid 9 of the mixing bowl 3. For such a purpose, an actuating arm 26, projecting into the pivot path of the tab 11, is provided on the locking member 25. FIG. 2 illustrates the locking member 25 in its pivoted position, in which one lever arm 24 rests on the switching rod 21. In such a position, one switching contact 17 has already been switched into its closed position.

Figure 5:
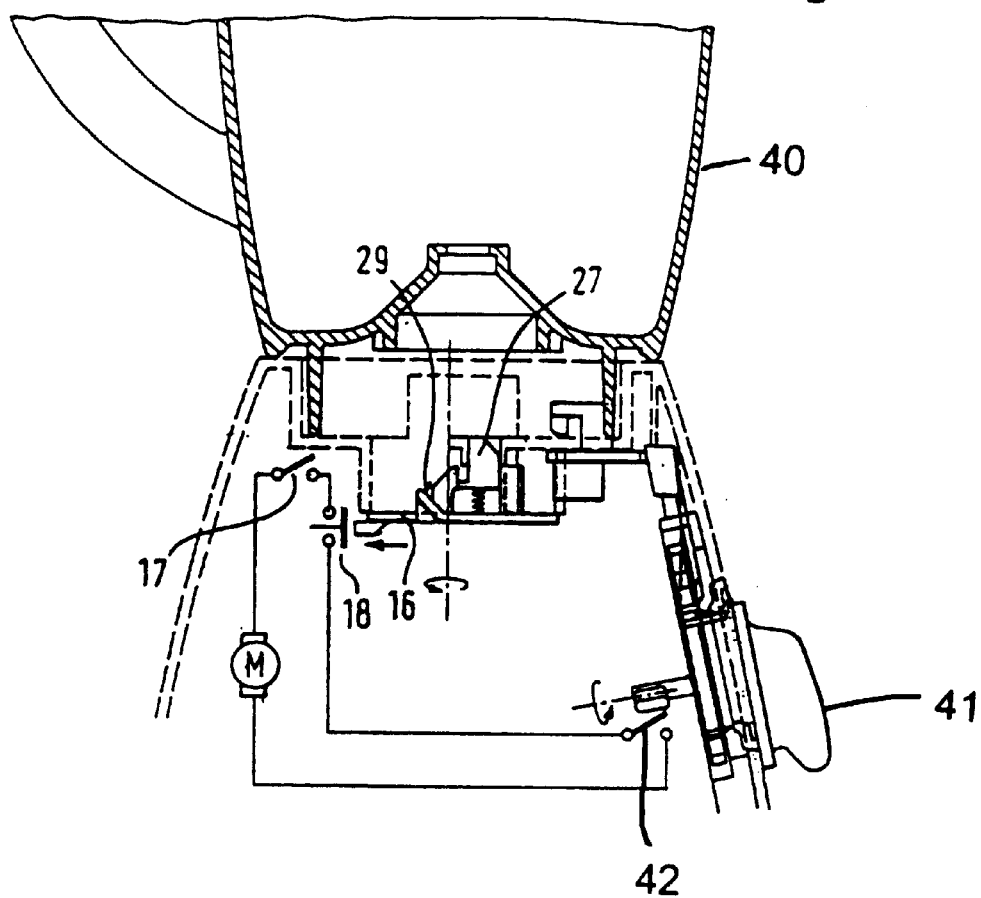
FIG. 5 is another fragmentary cross-sectional and partially hidden view of the circuit board in a region of a coupling point of the food processor of FIG. 2.
Figure 6:
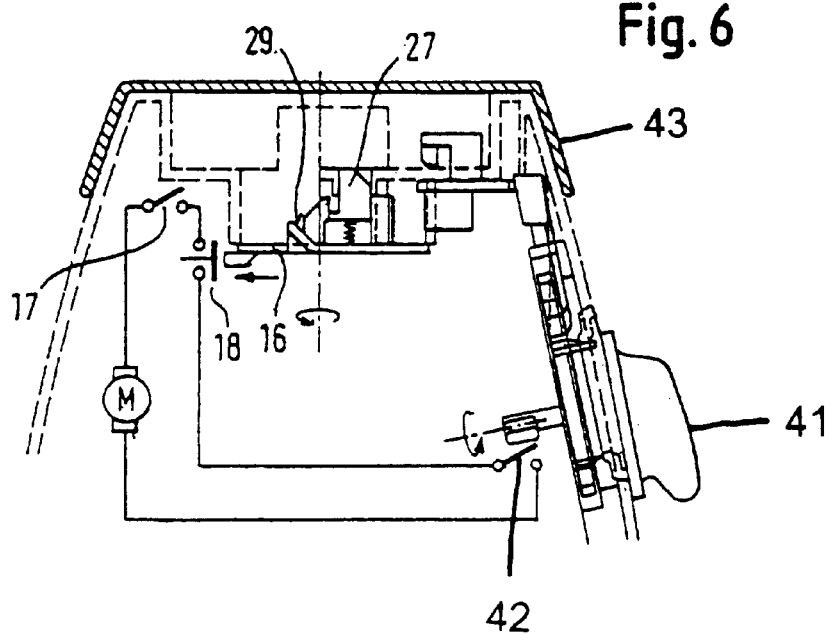
FIG. 6 is another fragmentary cross-sectional and partially hidden view of the circuit board in a region of a coupling point of the food processor of FIG. 2.

As shown in FIGS. 5 and 6, when a processing appliance 40 or cover part 43 is placed on the other coupling point (receiving depression 13), an intermediate member 27 (which rests on an approach slope 29 provided on a pivot arm 28 of the circuit board 16) presses against the approach slope 29. When it does so, the vertically adjustable intermediate member 27 slides along the approach slope 29 and, thereby, pivots the circuit board 16 in the direction indicated by an arrow 30. As the switching rod 21 is supported by its other end 23 on one lever arm 24 of the locking member 25, and, therefore, cannot move aside, the switching rod 21 is adjusted at its end fixed to the circuit board 16. Such an adjusting movement results in a switching-over of the other switching contact 18 into its closed position. FIG. 2 shows the closed position of the switching contact 18. As the two switching contacts 17, 18 are electrically in series, an electrical connection to the drive motor 6 exists as a result of their closed state. If only the switch 42 lying in the electrical circuit of the drive motor 6, and similarly electrically connected in series with the two switching contacts 17, 18, is now switched on, the drive motor 6 can start. As the switching contacts 17, 18 can only be switched into their closed position by placing a mixing bowl 3, and processing appliance 40 or cover part 43 on the appropriate coupling point, 2 or 13 as the case may be, the configuration ensures that the two coupling points 2, 13 provided with the output shafts 7, 15 are always covered when the drive motor 6 is running.

Elements are also provided, whereby a force is exerted both on the switching rod 21 and on the circuit board 16 forcing these back into or restoring them to their positions of rest. For example, a spring 37 is coupled to the circuit board 16 and pivots the circuit board 16 back into its starting position as soon as it is released for a restoring movement by removal of a processing appliance or cover part placed on the other coupling point 13. The restoration also applies to the switching rod 21, which, when one lever arm 24 of the locking member 25 is pivoted back by the restoring force exerted by the element concerned, returns to its starting position. The locking member 25 may be provided with a non-illustrated restoring spring that pivots the locking member 25 back when the backward pivoting path is freed by the pivoting away of the tab 11. The restoring of the switching rod 21 and the pivoting-back of the circuit board 16 entail a switching-over of the switching contacts 17, 18 respectively into their open positions. The switchover interrupts the electrical circuit of the drive motor 6 so that the output shafts 7, 15 come to a halt immediately when a processing appliance or cover part is removed from the appropriate coupling point, 2 or 13.

Figure 4:
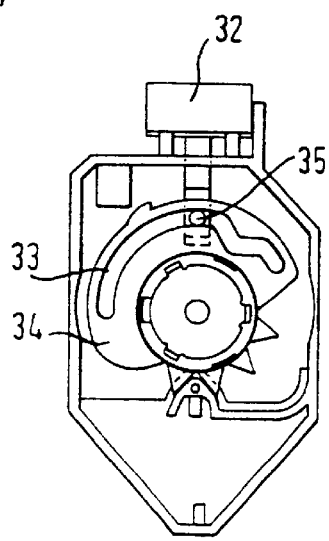
FIG. 4 is a side elevational view of the coupling of a locking block to a switch actuating element of the food processor of FIGS. 2 and 3.
Figure 3:
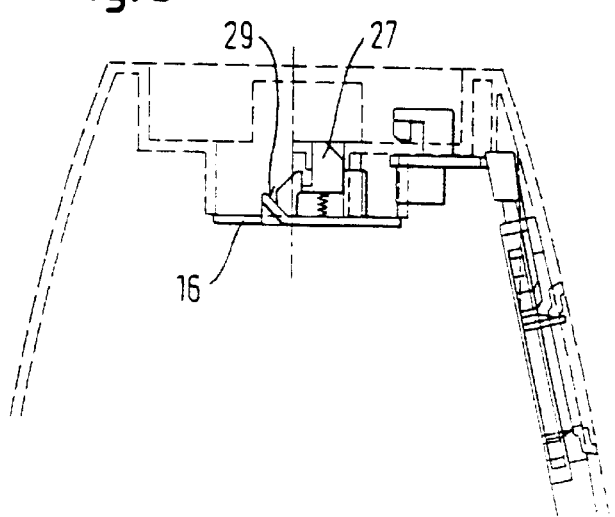
FIG. 3 is a fragmentary cross-sectional and partially hidden view of the circuit board in a region of a coupling point of the food processor of FIG. 2.

In addition to the electrical safeguard provided, a mechanical safety system to prevent switching-on of the actuating element 41 (FIGS. 5 and 6) of the switch 42 (FIGS. 5 and 6) lying in the electrical circuit of the drive motor 6 is also provided. A second lever arm 31 of the locking member 25, as illustrated in FIG. 4, provides such a safeguard against switching-on. In a rest position of the locking member 25, in which the latter is not pivoted by the tab 11 of the lid 9, the further lever arm 31 lies vertically above a locking block 32. The locking block 32 is coupled with positive fitting to a slotted disk 34 by a pin 35 engaging into the sliding slot 33 of the slotted disk 34. A non-illustrated switching toggle is connected to the slotted disk 34 in a rotation-proof manner and actuates the switch 42 lying in the electrical circuit of the drive motor 6. If the switching toggle is twisted to switch on the drive motor 6, the slotted disk 34 is simultaneously twisted as well. The locking block 32 is raised through the pin 35 sliding in the sliding slot 33. Such lifting is only possible, however, if the further lever arm 31 of the locking member 25 is pivoted away laterally, in other words, no longer projects into the adjustment path of the locking block 32. Such a state, however, exists only if a mixing bowl 3, closable by the lid 9, is placed on one coupling point (base part 2). That is because, in such a case, the locking member 25 is pivoted through the tab 11 in the direction indicated by an arrow 3G. As a result, the further lever arm 31 frees the adjustment path of the locking block 32.

The circuit board 16 may be produced and processed as a separate part with the switching contacts 17, 18 and the switching rod 21. Thus, the three-dimensional configuration of the switching contacts 17, 18 is no longer dependent on circumstances specific to the appliance. In addition, the safety device entails greatly reduced assembly and production costs.

We claim:

1. A food processor, comprising:
 a housing having two coupling points for receiving attachments thereat, the attachments including a cover part and different appliances, said two coupling points three-dimensionally spaced apart from one another;
 a drive motor disposed in said housing, said drive motor having an electrical circuit with:
  a switch; and
  at least two switching contacts connected in series and each having an open position and a closed position, a first of said at least two switching contacts being switched into said closed position one of directly and indirectly dependent upon a placement of one of the cover part and an appliance at a first of said two coupling points, a second of said at least two switching contacts being switched into said closed position one of directly and indirectly by a placement of another of the cover part and an appliance at a second of said two coupling points;
 two output shafts each connected to and driven by said drive motor, said two output shafts respectively disposed at each of said two coupling points for connection to a respective one of the cover part and the appliances; and
 an actuating element coupled to said switch and disposed on said housing for actuating said switch.

2. The food processor according to claim 1, including:
 a pivotable circuit board formed with said two switching contacts, a placement of one of the appliances and the cover part at one of said two coupling points causing said circuit board to pivot and switch over one of said two switching contacts; and
 a bias device producing a force retaining said circuit board in a rest position.

3. The food processor according to claim 1, including:
 a pivotable circuit board formed with said two switching contacts, said circuit board pivoting to switch over one of said two switching contacts when one of the appliances and the cover part is placed at one of said two coupling points; and
 a bias device producing a force retaining said circuit board in a rest position.

4. The food processor according to claim 1, including:
 a pivotable circuit board formed with said two switching contacts, a pivoting of said circuit board switching over one of said two switching contacts when one of the appliances and the cover part is placed at one of said two coupling points; and
 a bias device producing a force retaining said circuit board in a rest position.

5. The food processor according to claim 1, including:
 a pivotable circuit board formed with said two switching contacts, a pivoting of said circuit board to switch over one of said two switching contacts being dependent upon a placement of one of the appliances and the cover part at one of said two coupling points; and
 a bias device producing a force retaining said circuit board in a rest position.

6. The food processor according to claim 5, wherein said bias device is a spring.

7. The food processor according to claim 5, wherein:
 said circuit board has a switching rod with two ends;
 one of said two ends is fixed to said circuit board;
 another of said two ends executes a switching movement upon a placement of one of the appliances and the cover part at a first of said two coupling points; and
 said two switching contacts are coupled to said switching rod.

8. The food processor according to claim 5, wherein:
said circuit board has a switching rod with two ends;
one of said two ends is fixed to said circuit board;
another of said two ends receiving a switching force dependent upon a placement of one of the appliances and the cover part at one of said two coupling points; and
said two switching contacts are coupled to said switching rod.

9. The food processor according to claim 7, wherein:
said housing has a vertically extending housing part with a slit; and
the attachments include a mixing bowl having a rotatable lid with a radially outward-projecting tab to be inserted into said slit upon rotation of the lid and to act one of directly and indirectly on said switching rod and switch over one of said two switching contacts.

10. The food processor according to claim 9, wherein:
said housing has an interior; and
a locking member:
    has at least one lever arm disposed to act selectively on said switching rod; and
    is disposed in said interior of said housing adjacent said slit; and
    is to be actuated by the tab.

11. The food processor according to claim 9, wherein said circuit board pivots when one of the appliances and the cover part is placed on a second of said two coupling points.

12. The food processor according to claim 11, wherein said circuit board has an approach slope receiving a pivoting force when one of the appliances and the cover part is placed at said housing.

13. The food processor according to claim 12, wherein:
said circuit board has a part connected thereto; and
said approach slope is disposed one of directly on said circuit board and on said part.

14. The food processor according to claim 13, including an intermediate member resting on said approach slope and being depressed when one of the appliances and the cover part is placed at said housing.

15. The food processor according to claim 10, including:
a locking block having an adjustment path, said locking block connected to said actuating element and adjusted by a switching movement of said actuating element; and
said locking member having:
    a rest position; and
    at least one further lever arm:
        lying in said adjustment path of said locking block in said rest position of said locking member; and
        being freed from said adjustment path when said locking member is pivoted.

16. The food processor according to claim 7, wherein:
said housing has a vertically extending housing part with a slit;
a mixing bowl is adapted to be placed on one of said two coupling points and has a rotatable lid with a radially outward-projecting tab entering said slit when said lid is rotated and imparting a force one of directly and indirectly on said switching rod to switch over one of said two switching contacts.

17. The food processor according to claim 16, wherein:
said housing has an interior; and
a locking member:
    has at least one lever arm disposed to act selectively on said switching rod;
    is disposed in said interior of said housing adjacent said slit; and
    is actuated selectively by said tab.

18. The food processor according to claim 16, wherein said circuit board pivots when one of the appliances and the cover part is placed on a second of said two coupling points.

19. The food processor according to claim 18, wherein said circuit board has an approach slope receiving a pivoting force when one of the appliances and the cover part is placed at said housing.

20. The food processor according to claim 19, wherein:
said circuit board has a part connected thereto; and
said approach slope is disposed one of directly on said circuit board and on said part.

21. The food processor according to claim 19, including an intermediate member resting on said approach slope and being depressed when one of the appliances and the cover part is placed at said housing.

22. The food processor according to claim 17, including:
a locking block having an adjustment path, said locking block connected to said actuating element and adjusted by a switching movement of said actuating element; and
said locking member having:
    a rest position; and
    at least one further lever arm:
        lying in said adjustment path of said locking block in said rest position of said locking member; and
        being freed from said adjustment path when said locking member is pivoted.

23. A food processor, comprising:
a housing having two coupling points for receiving attachments thereat, the attachments including a cover part and different appliances, said two coupling points three-dimensionally spaced apart from one another;
a drive motor disposed in said housing, said drive motor having an electrical circuit with:
    a switch; and
    at least two switching contacts connected in series and each having an open position and a closed position, a first of said at least two switching contacts being switched into said closed position one of directly and indirectly dependent upon a placement of one of the attachments at a first of said two coupling points, a second of said at least two switching contacts being switched into said closed position one of directly and indirectly by a placement of another of the attachments at a second of said two coupling points;
two output shafts each connected to and driven by said drive motor, said two output shafts respectively disposed at each of said two coupling points for connection to a respective one of the attachments; and
an actuating element coupled to said switch and disposed on said housing for actuating said switch.

* * * * *